United States Patent
Eckley (10) Patent No.: US 9,483,047 B2
(45) Date of Patent: Nov. 1, 2016

(54) SYSTEM AND METHOD FOR OPERATING A MACHINE AND PERFORMING QUALITY ASSURANCE

(71) Applicant: The Boeing Company, Chicago, IL (US)

(72) Inventor: David J. Eckley, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 371 days.

(21) Appl. No.: 14/171,314

(22) Filed: Feb. 3, 2014

(65) Prior Publication Data
US 2015/0153728 A1  Jun. 4, 2015

Related U.S. Application Data (60) Provisional application No. 61/911,719, filed on Dec. 4, 2013.

(51) Int. Cl.
| | |
|---|---|
| *G05B 19/418* | (2006.01) |
| *G05B 19/401* | (2006.01) |
| *G05B 19/42* | (2006.01) |
| *G06F 19/00* | (2011.01) |

(52) U.S. Cl.
CPC ....... *G05B 19/41875* (2013.01); *G05B 19/401* (2013.01); *G05B 19/4207* (2013.01); *G05B 2219/37194* (2013.01); *G05B 2219/37205* (2013.01); *G05B 2219/37221* (2013.01); *G05B 2219/37593* (2013.01); *Y02P 90/265* (2015.11)

(58) Field of Classification Search
None
See application file for complete search history.

(56) References Cited

U.S. PATENT DOCUMENTS

| | | | |
|---|---|---|---|
| 5,841,668 A | * | 11/1998 | Pahk .................... G05B 19/404 33/503 |
| 6,681,145 B1 | | 1/2004 | Greenwood et al. |
| 7,800,758 B1 | | 9/2010 | Bridges et al. |
| 2011/0295408 A1 | | 12/2011 | Burgel et al. |
| 2011/0316977 A1 | | 12/2011 | Pienaar |
| 2012/0239181 A1 | | 9/2012 | Gu et al. |

FOREIGN PATENT DOCUMENTS

| | | |
|---|---|---|
| EP | 1 139 189 | 10/2001 |
| EP | 2 570 236 | 3/2013 |
| WO | WO 2006/024844 | 3/2006 |

OTHER PUBLICATIONS

Extended European Search Report, EP 14 19 6347 (2015).
(Continued)

*Primary Examiner* — Eric C Wai
(74) *Attorney, Agent, or Firm* — Walters & Wasylyna LLC (57) ABSTRACT

A method for operating a numerical control machine including generating monument point data having a plurality of reference points representing a plurality of monument points on a machine bed, generating part data having plurality of reference points representing a part with respect to the plurality of monument points, generating theoretical machined part data having a plurality of reference points representing a theoretical machined part, generating control data by integrating the part data and the theoretical machined part data, generating machine control data by integrating the control data and the monument point data, and executing the machine control data for controlling operation of a numerical control machine to form a machined part.

18 Claims, 8 Drawing Sheets

(56) References Cited

OTHER PUBLICATIONS

"Reverse Engineering & Digitizing," CS Products Ltd., www.cs-products.co.uk/reverse-engineering.php (2013).
"CNC Engineering Sales & Service," CNCENGS&S, www.cnceng.com/au/3d_scanning.html (2013).
"Design from 3D Scan Data™, XOR™ Redesign," rapidform.com (2013).
"New Version of Renishaw's On-machine 3D Part Verification Software," renishaw.com (2013).
"Mcosmos SCANPAC, Coordinate Measuring Machines" Mitutoyo America Corporation (2012).
"Engineering Documents, Tormach CNC Machine," tormach.com (2013).

* cited by examiner

SYSTEM AND METHOD FOR OPERATING A MACHINE AND PERFORMING QUALITY ASSURANCE

PRIORITY

This application is a non-provisional of, and claims priority from, U.S. Ser. No. 61/911,719 filed on Dec. 4, 2013, the entire contents of which are incorporated herein by reference.

FIELD

The present disclosure is generally related to machines and, more particularly, to a system and method for operating a machine, such as a numerical control machine, and performing quality assurance on a machined part.

BACKGROUND

Numerical control ("NC") machines, such as a computer numerical control ("CNC") machine, are automated machine tools that are operated by programmed commands encoded on a storage medium. The NC machine includes a machine tool (e.g., a spindle) that performs the machining and computer-aided manufacturing programs that drive the machine and position the spindle in three-dimensional space (e.g., multiaxis machining) with respect to a reference coordinate system of the machine.

During a machining operation, the part is mounted to a fixture and the fixture is loaded onto a machine bed of the NC machine. The position of the part relative to the machine bed is located and the machine is zeroed to properly position the machine tool in space relative to the location of the part. The part may then be machined (e.g., drill, route, cut, and/or trim). Often, the NC machine includes an indexing system used to repeatably locate the part relative to the fixture and to repeatably locate the fixture relative to the machine bed.

There are a number of drawbacks to current machining processes. For example, tooling fixtures can be highly complex, which is driven by tight tolerance requirements. Further, any part-to-fixture indexing and any fixture-to-machine bed indexing can be highly complex, which are also driven by tight tolerance requirements. This complexity can increase the cost and flow time required to produce an NC mill fixture, which can affect the offerability of a new product as well as the ability to meet customer emergent demands.

Moreover, the requirement to perform quality assurance of the machined part after the part is removed from the fixture drives additional cost, flow and impact to resources. For example, quality assurance can be performed by physically holding the part up to a component to which the part will be connected to determine if the machined features (e.g., holes and edges) align with the component geometry. If a machined feature does not properly align when the part is held up to the component, the part may be re-worked or scrapped, which interrupts the production cycle.

Accordingly, those skilled in the art continue with research and development efforts in the field of operating NC machines and performing quality assurance.

SUMMARY

In one embodiment, disclosed is a method for operating a machine, such as a numerical control machine, the method may include the steps of: (1) generating monument point data, the monument point data including a plurality of reference points representing a plurality of monument points on a machine bed, (2) generating part data, the part data including a plurality of reference points representing a part with respect to the plurality of monument points, (3) generating theoretical machined part data, the theoretical machined part data including a plurality of reference points representing a theoretical machined part, (4) generating control data by integrating the part data and the theoretical machined part data, the control data including a plurality of reference points representing an integration of the part and the theoretical machined part, (5) generating machine control data by integrating the control data and the monument point data, the machine control data including a plurality of reference points representing the integration of the part and the theoretical machined part positioned on the machine bed with respect to the plurality of monument points, and (6) executing the machine control data for controlling operation of a machine to form a machined part.

In another embodiment, disclosed is a method for performing quality assurance, the method may include: (1) providing machine control data, the machine control data including a plurality of reference points representing an integration of a part and a theoretical machined part positioned on a machine bed with respect to a plurality of monument points, (2) generating machined part data, the machined part data including a plurality of reference points representing a machined part positioned on the machine bed with respect to the plurality of monument points, and (3) generating quality assurance data by comparing the machined part data and the machine control data to determine a correlation between the machined part data and the machine control data.

In another embodiment, also disclosed is a system for operating a machine, such as a numerical control machine, the system may include a machine including a machine bed and a machine tool with respect to the machine bed, a plurality of monument points connected to the machine bed in an orthogonal orientation, the plurality of monument points defining a monument point axis system, at least one image capture device proximate the machine bed, the at least one image capture device being configured to scan the plurality of monument points on the machine bed and a part positioned on the machine bed, and at least one computer in communication with the machine and the at least one image capture device, the at least one computer being configured to: (1) receive monument point data, the monument point data including a plurality of reference points representing the plurality of monument points on the machine bed, (2) receive part data, the part data including a plurality of reference points representing the part with respect to the plurality of monument points, (3) receive theoretical machined part data, the theoretical machined part data including a plurality of reference points representing a theoretical machined part, (4) generate control data by integrating the part scan data and the theoretical machined part data, the control data including a plurality of reference points representing an integration of the part and the theoretical machined part, (5) generate machine control data by integrating the control data and the monument point data, the machine control data including a plurality of reference points representing the integration of the part and the theoretical machined part positioned on the machine bed with respect to the plurality of monument points, and (6) execute the machine control data for controlling operation of the machine to form a machined part.

Other embodiments of the disclosed system and methods will become apparent from the following detailed description, the accompanying drawings and the appended claims.

DETAILED DESCRIPTION

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 1:
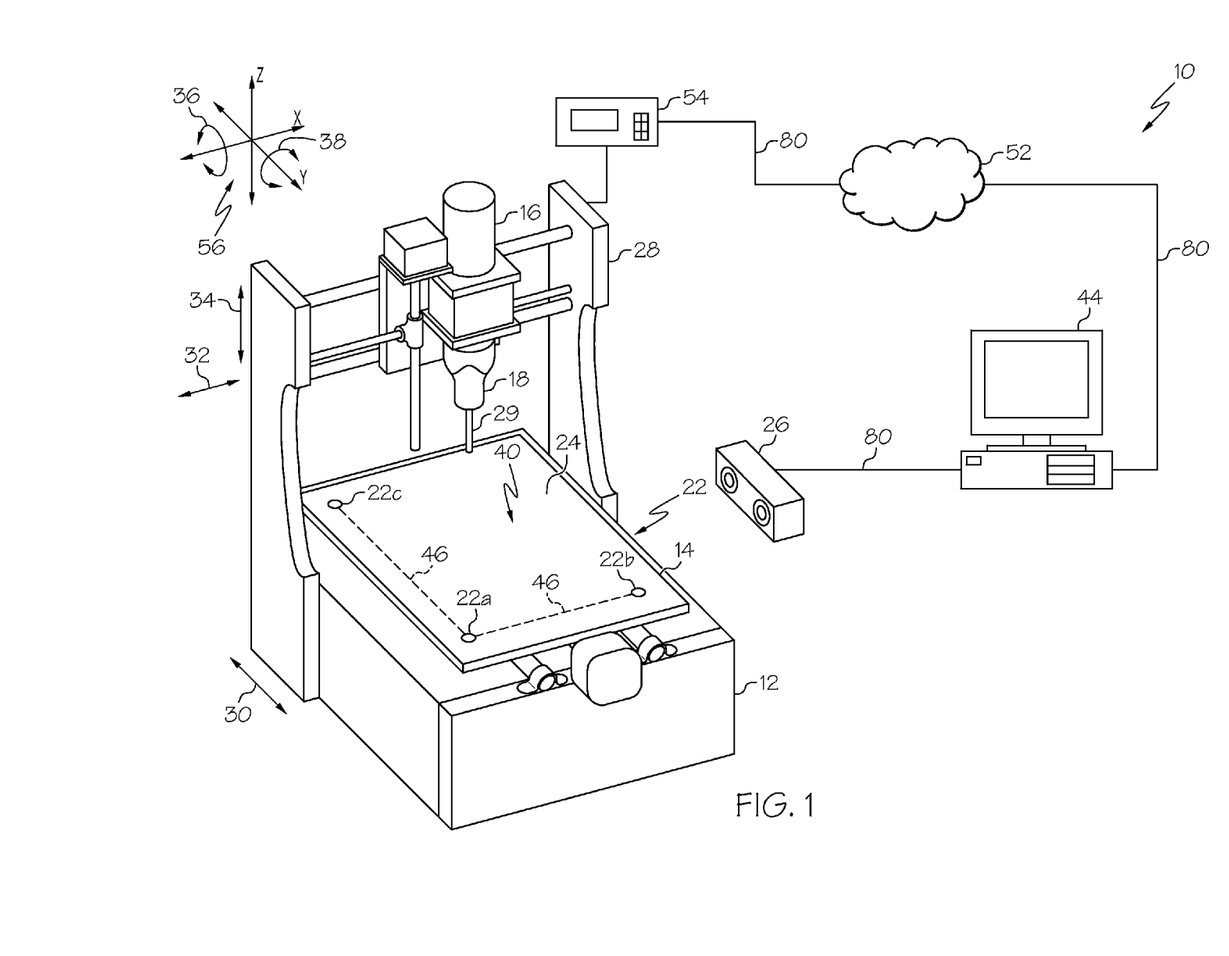
FIG. 1 is a front perspective view of one embodiment of the disclosed system for operating a machine.
Figure 2:
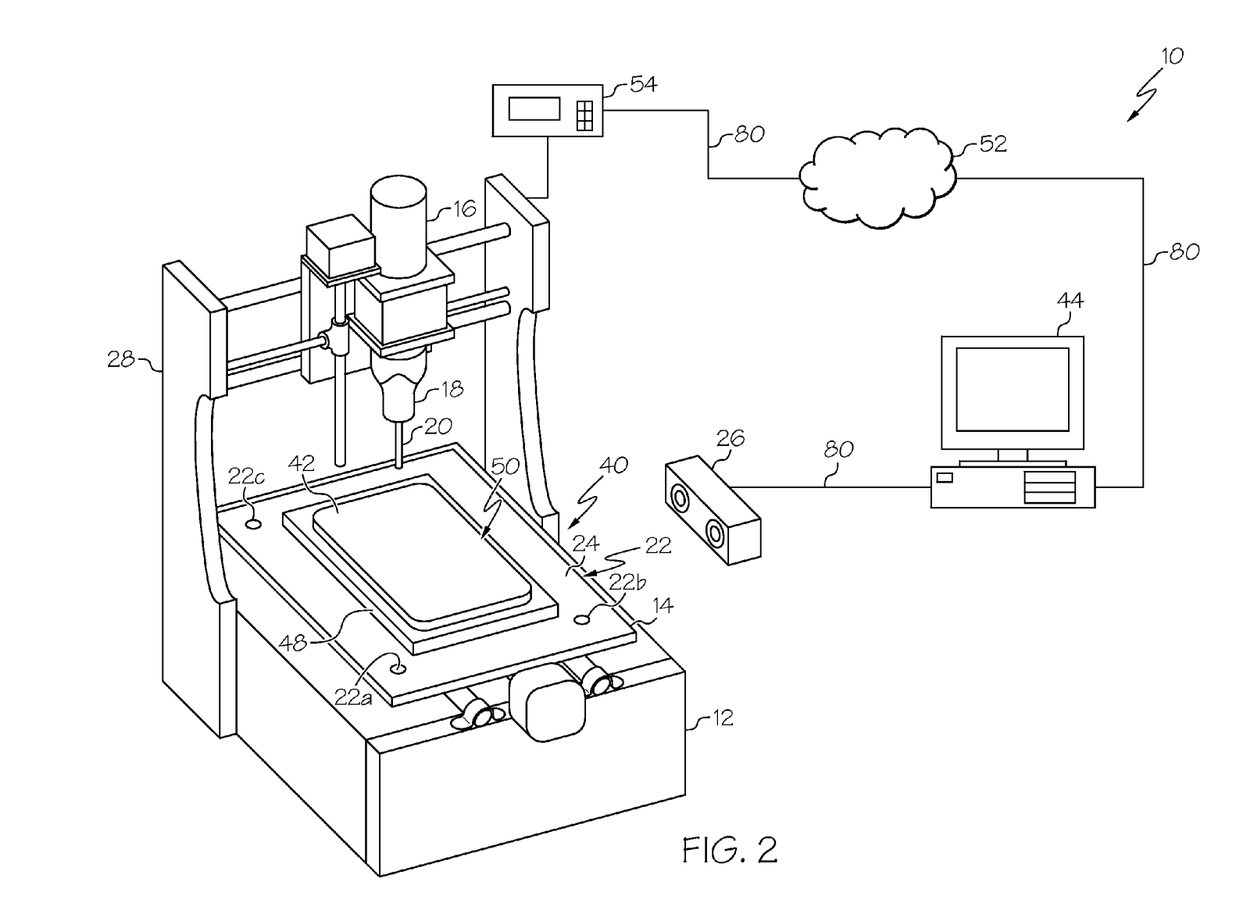
FIG. 2 is a front perspective view of the disclosed system for operating a machine depicting a part positioned on a machine bed.

Referring to FIGS. 1 and 2, disclosed is one embodiment of a system, generally designated 10, for operating a machine, such as a numerical control machine. The disclosed system 10 may include a machine, such as a numerical control ("NC") machine 12 (e.g., a multi-axis computer numerical control ("CNC") machine), and an image capture device 26. Throughout the description, implementation of disclosed system 10 and method 200 (FIG. 5) may be discussed for an NC machine 12, however, those skilled in the art will appreciate that the principles are applicable to robots, automated tools, machines, fixtures, and other objects that move under automatic (e.g., computer) or manual control.

The NC machine 12 may include a machine bed 14 and a machine tool 16. The machine bed 14 may be any suitable cutting bed of the type used to hold a raw or unmachined part 42 (FIG. 2), such as a workpiece or other material, while the part 42 is being machined by the machine tool 16. The machine tool 16 may include a spindle 18 configured to hold a probe 29 (FIG. 1) or a cutting tool 20 (FIG. 2). The cutting tool 20 may be a rotary cutting tool, a plasma cutter, an ultrasonic cutter, a laser cutter, an oxygen acetylene cutter, or any other type of cutter.

The NC machine may include a machine axis system 56 (e.g., the machine coordinate system). The machine tool 16 and/or the machine bed 14 may be moveable about multiple axes (e.g., a 5-axis machine). The machine bed 14 may translate linearly along the X-axis, the Y-axis and/or the Z-axis and/or the machine tool 16 may translate linearly along the X-axis, the Y-axis and/or the Z-axis and/or rotate about the Y-axis, the X-axis and/or the Z-axis. For example, the machine bed 14 may ride on rails (not shown). The machine bed 14 may be moveable along the Y-axis in the direction of arrow 30. The machine tool 16 may be mounted to a frame 28 and ride on rails (not shown). The machine tool 16 may be moveable along the X-axis in the direction of arrow 32, along the Z-axis in the direction of arrow 34, about the X-axis in the direction of arrow 36, and about the Y-axis in the direction of arrow 38. Various types of frames 28 may be used. For example, the frame 28 may be a gantry, a cantilever beam, or other support device suitable for holding the machine tool 16. Typically, at least a portion of the frame 28 may be above the machine bed 14. Those skilled in the art will appreciate that the NC machine 12 may include other multiaxis configurations.

The NC machine 12 may include a plurality of monument points 22 connected to the machine bed 14. The plurality of monument points 22 may be positioned about an outer periphery of the machine bed 14 such that a work envelope 40 of the NC machine 12 may fall within the plurality of monument points 22. For example, the plurality of monument points 22 may be permanently connected to known static locations or positions upon a work surface 24 of the machine bed 14. As another example, the plurality of monument points 22 may be removably connected to known static locations or positions upon the work surface 24 of the machine bed 14.

In an example implementation, the plurality of monument points 22 may include three monument points, referred to individually as a first monument point 22*a*, a second monument point 22*b* and a third monument point 22*c*, positioned in a substantially orthogonal relationship with respect to the machine bed 14 and to each other. The plurality of monument points 22 may define a monument point axis system 46. For example, the first monument point 22*a* may define an axis-origin position of the monument point axis system 46. The second monument point 22*b* may be spaced away from and aligned (e.g., axially) with the first monument point 22*a* to define the X-axis of the monument point axis system 46 (e.g. relative to the machine bed 14). The third monument point 22*c* may be spaced away from and aligned (e.g., axially) with the first monument point 22*a* to define the Y-axis of the monument point axis system 46 (e.g. relative to the machine bed 14).

The plurality of monument points 22 may include any optical target suitable to be recognized, captured, and/or defined by the image capture device 26 during an image capture operation. For example, the plurality of monument points 22 may be light reflectors, laser target reflectors, laser tracker targets, or the like.

Figure 5:
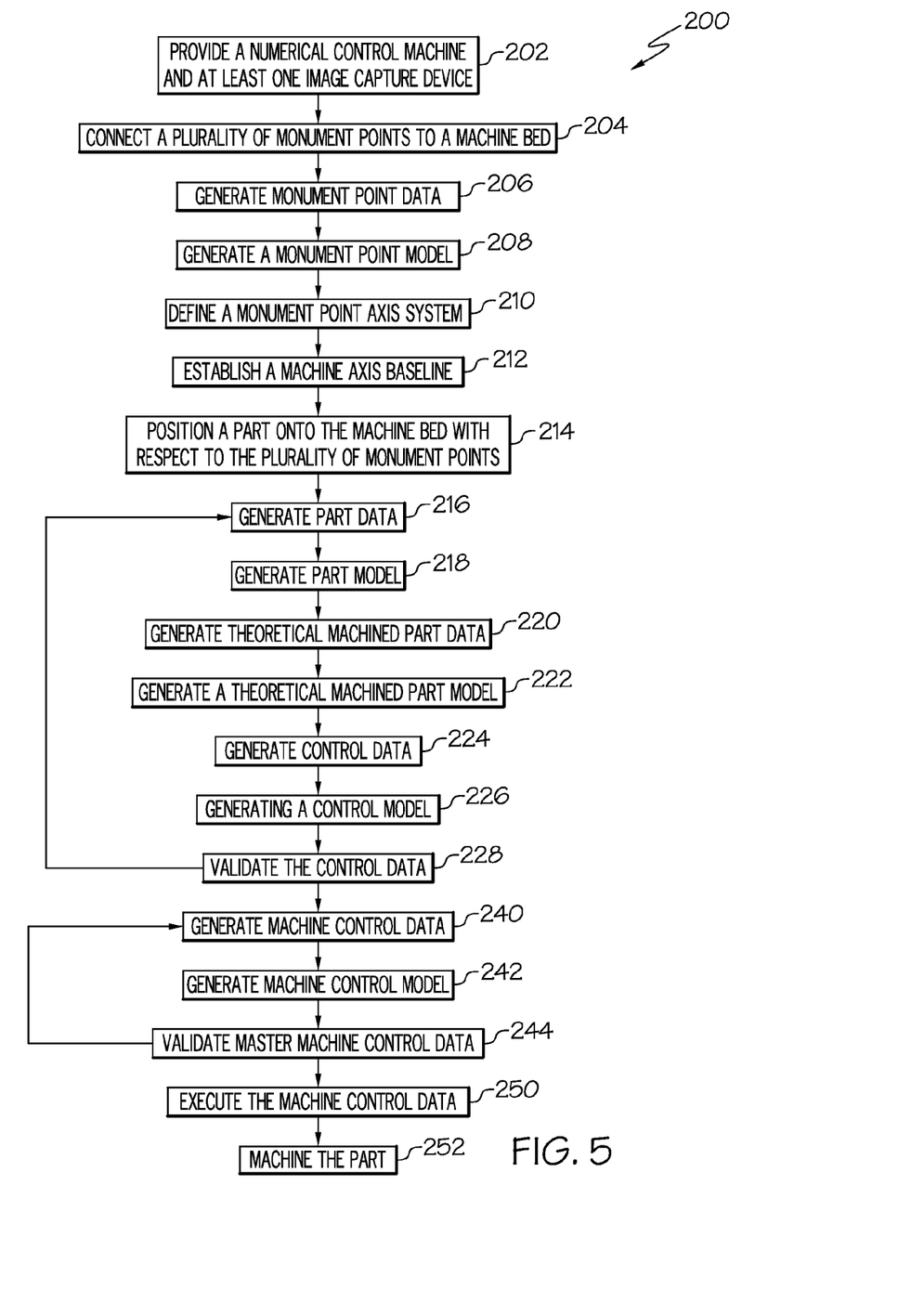
FIG. 5 is a flow diagram of one embodiment of the disclosed method for operating a machine.

Prior to operation of the NC machine 12, machine axis system 56 of the NC machine 12 may be zeroed to the monument point axis system 46 defined by the plurality of monument points 22, as described in more detail herein (FIG. 5). An unmachined part, referred to generally as the part 42 (FIG. 2), may be positioned on the machine bed 14 with respect to the plurality of monument points 22 (e.g., within the work envelope 40). For example, the part 42 may be loaded onto a fixture 48 and the fixture 48 may be loaded onto the machine bed 14. The part 42 may be any workpiece or component material to be machined (e.g., drilled, countersunk, routed, cut, trimmed and/or otherwise machined) by the NC machine 12 to form a machined part (not shown). For example, the part 42 may be an unmachined or partially machined panel of a vehicle (e.g., an aircraft) and the machined part may be a machined panel (e.g., a finished panel) of the vehicle suitable for mounting. The fixture 48 may be any customized device that is used to position and hold the part 42 in position on the machine bed 14. Optionally, an operator may input basic information about the part 42, such as material thickness, into a computer 44.

The image capture device 26 may be located or positioned proximate (e.g., at or near) the machine bed 14. For example, the image capture device 26 may be positioned above the machine bed 14. The image capture device 26 may be a stand-alone device, a portable device, or may be integral to the NC machine 12. For example, the image capture device 26 may be mounted to a tri-pod or similar support device. As another example, the image capture device 26 may be mounted to the frame 28.

The image capture device 26 may be any suitable device capable of capturing a digital image (e.g., a scan) of an object and/or generating digital data (e.g., digital image data) representing the object based on a captured digital image of the object. For example, the image capture device 26 may include, but is not limited to, a digital camera, photogrammetry, a digital scanner, a light scanner (e.g., white light or blue light scanner), a laser scanner, an ultrasound scanner, or the like. For example, the image capture device 26 may be a high-resolution three-dimensional ("3D") image scanner. One example of a 3D image scanner may project a pattern of light onto an object and the image capture device 26 may capture the image of the light on the object as data. As a specific, non-limiting example, the image capture device 26 may be an ATOS 3D scanner from GOM® (Gesellschaft für Optische Messtechnik) of Braunschweig, Germany.

Those skilled in the art will appreciate that the image capture device 26 may be configured to capture multiple (e.g., two or more) 3D images (e.g., scanned images), which may be merged to produce composite digital data and/or a composite digital model. Further, multiple (e.g., two or more) image capture devices 26 may be used to produce multiple 3D images, which may be merged to produce composite digital data and/or a composite digital model.

Figure 3:
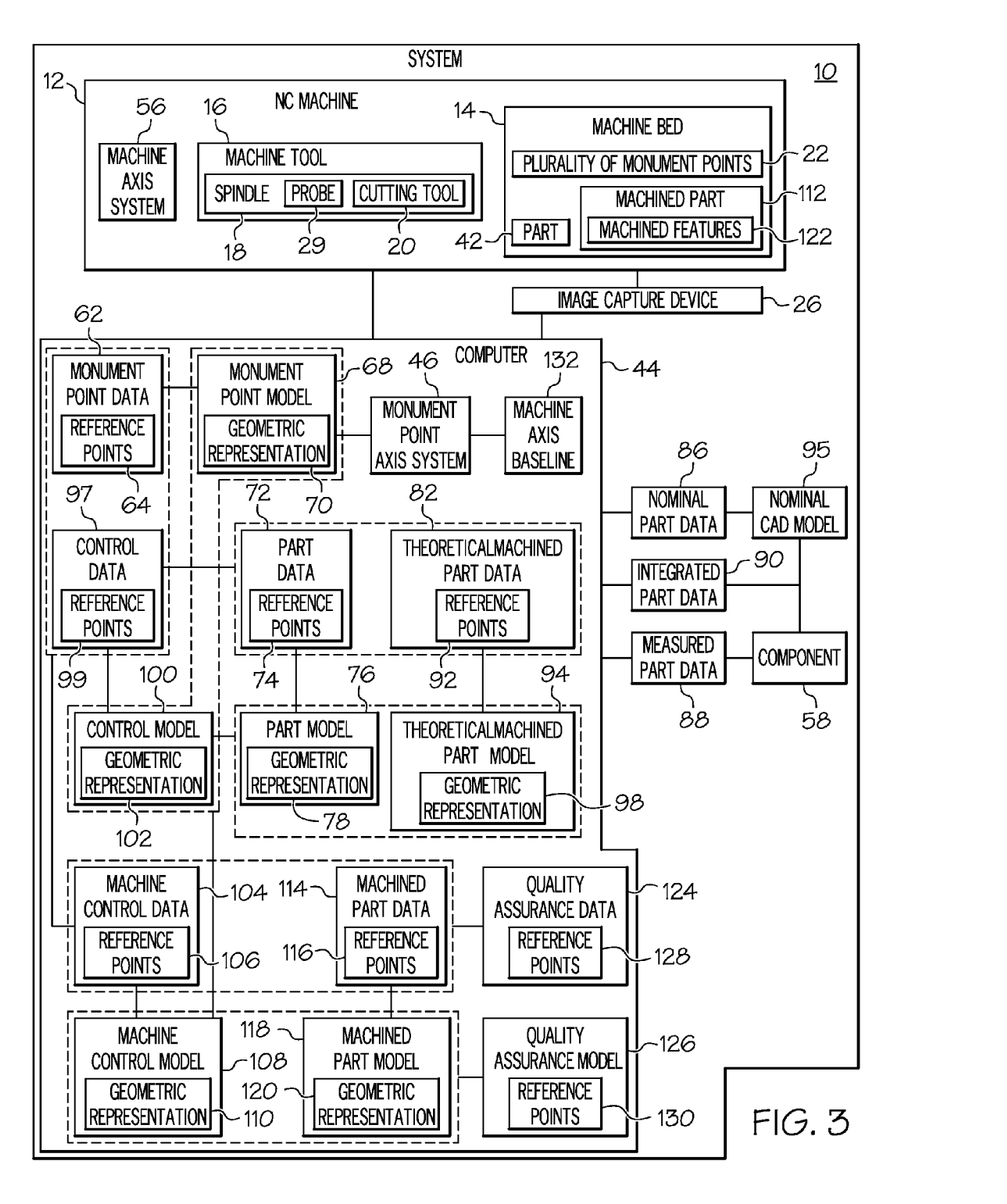
FIG. 3 is a block diagram illustrating an implementation of the disclosed system for operating a machine.

Referring to FIG. 3, the digital data generated by the image capture device may be any data representing the object based on a digital image of the object (e.g., the part 42 or the machined part 112). For example, the digital data may be referred to herein as part data 72 and machined part data 114. The digital data may include a plurality of reference points (e.g., a point cloud) representing the object. For example, the part data 72 may include a plurality of reference points 74 and the machined part data 114 may include a plurality of reference points 116.

As will be discussed in more detail herein, the digital data may be sent to the computer 44 via an electronic communication link 80 (FIG. 1), such as by cable or wireless communication. The digital data may be converted to a digital model (e.g., a part model 76 and a machined part model 118) representing the geometry of the scanned object (e.g., the part 42 or the machined part 112) by software and, optionally, displayed on the computer 44. The machine operator may confirm that the digital model based on the captured digital data properly represents the scanned object (e.g., the part 42 on the machine bed 14 with respect to the plurality of monument points 22).

Referring again to FIGS. 1 and 3, available operating programs and/or software for the NC machine 12 may reside in the computer 44 and/or in a data location 52. The data location 52 may be a local or network drive in electronic communication (e.g., a cable or wireless network) with the computer 44. Alternatively, the data location 52 and the computer 44 may be a single device. The software may create a new operating program (e.g., machine drive data) based on machine control data 104 that reflects the location and orientation of the part 42 with respect to the monument point axis system (FIG. 3).

A machine controller 54 (FIG. 1) may be connected to the NC machine 12 via the electronic communication link 80 (FIG. 1) to load the machine control data 104 and run the operating program to drive the multi-axis movement of the machine tool 16 and/or the machine bed 14, thereby properly locating and positioning the spindle 18 and cutting tool 20 (FIG. 2) with respect to the part 42 (FIG. 2). Alternatively, the computer 44 and the machine controller 54 may be a single device, the machine controller 54 and the data location 52 may be a single device, or the computer 44, the machine controller 54, and the data location 52 may be a single device.

The computer 44 may be configured to receive digital data (e.g., scanned image data) or sets of digital data from the image capture device 26 through the electronic communication link 80 (FIG. 1). For example, the computer may receive the part data 72 and/or the machined part data 114 from the image capture device 26. The computer 44 may run image-processing software implemented as instructions on a computer-readable medium to process the digital data (e.g., part data 72 and/or machined part data 114) and generate the digital models (e.g., part model 76 and/or machined part model 118). In an example implementation, the image capture device 26 may send raw digital data to the computer 44, in which case the computer 44 may include the image-processing software. In another example implementation, the image capture device 26 may include the imaging-processing software, in which case the image capture device 26 may send processed digital data to the computer 44.

The computer 44 may be configured to receive digital data from another source. For example, the computer 44 may receive theoretical machined part data 82 from portable coordinate measurement equipment (e.g., measured data 88) or from another computer (nominal part data 86). The computer may run software implemented as instructions on a computer-readable medium to process the theoretical machined part data 82 and generate the theoretical machined part model 94.

Referring to FIG. 5 and in reference to FIGS. 1-4, disclosed is one embodiment of a method, generally designated 200, for operating a machine, such as a numerical control machine. As shown at block 202, the NC machine 12 (e.g., a CNC machine) and the image capture device 26 may be provided. As shown at block 204, the plurality of monument points 22 (e.g., the first monument point 22a, the second monument point 22b and the third monument point 22c) may be connected to the machine bed 14.

Those skilled in the art will recognize that the operational step of connecting the plurality of monument points 22 to the machine bed 14, as illustrated in block 204, may be a one-time action if the plurality of monument points 22 is permanently affixed to the machine bed 14. If the location of one or more of the plurality of monument points 22 is changed (e.g., a removable monument point), then the operational step illustrated in block 206 may be performed after a change of location of one or more monument points of the plurality of monument points 22.

As shown at block 206, monument point data 62 (FIG. 3) may be generated. The monument point data 62 may be generated by equipping the machine tool 16 (e.g., equipping the spindle 18) with a probe 29 (FIG. 1). The machine tool 16 (e.g., the spindle 18) may be moved to align (e.g., axially) with plurality of monument points 22 (e.g., jogged) to probe (e.g., contact) each of the plurality of monument points 22 with the probe 29. The monument point data 62 may include data representing the location of the plurality of monument points 22 relative to the machine bed 14 based on the probing of the plurality of monument points 22. Thus, the monument point data 62 may include a plurality of reference points 64 representing the plurality of monuments points 22 on the machine bed 14. The monument point data 62 may be received by the computer 44 (e.g., via the electronic communication link 80). For example, software implemented as instructions on a computer-readable medium (e.g., a medium readable by computer 44 and/or the image capture device 26) may generate (e.g., automatically) the monument point data 62 based on the data generated via the probe 29 contacting the plurality of monument points 22.

As shown at block 208, a monument point model 68 (FIG. 3) may be generated from the monument point data 62. The monument point model 68 may include a geometric representation 70 of the plurality of monument points 22 on the machine bed 14. For example, software implemented as instructions on a computer-readable medium (e.g., a medium readable by computer 44) may generate the monument point model 68 by processing the monument point data 62.

As shown at block 210, a monument point axis system 46 (FIG. 1) may be defined. The monument point axis system 46 may be defined by the orthogonal coordinate system established by the plurality of (e.g., three) monument points 22 connected to the machine bed 14. For example, the monument point axis system 46 may be defined by the monument point data 62 and/or the monument point model 68. For example, the plurality of reference points 64 representing the plurality of monument points 22 of the monument data 62 and/or the geometric representation 70 of the plurality of monument points 22 of the monument point model 68 may be used as a reference coordinate system to define the monument point axis system 46. For example, software implemented as instructions on a computer-readable medium may define the monument point axis system 46 by processing the monument point data 62 and/or the monument point model 68.

As shown at block 212, a machine axis baseline 132 (FIG. 3) may be established by zeroing the machine axis system 56 of the NC machine 12 to the monument point axis system 46 (FIG. 1). For example, the machine axis baseline 132 may be established by translating and aligning (e.g., axially) the machine axis system 56 with the monument point axis system 46.

In an example implementation, the spindle 18 of the machine tool 16 may be equipped with the probe 29 (FIG. 1). The spindle 18 may be moved to align (e.g., axially) with the plurality of monument points 22 (e.g., the first monument point 22a, the second monument point 22b and the third monument point 22c) and the plurality of monument points 22 (e.g., the first monument point 22a, the second monument point 22b and the third monument point 22c) may be probed (e.g., contacted) with the probe 29 (e.g., jogging the spindle 18). In an example implementation, the plurality of monument points 22 may be probed in a hierarchical sequence to locate the monument point axis system 46 (e.g., probing the first monument point 22a to define the axis-origin of the monument point axis system, then probing the second monument point 22b to define the X-axis of the monument point axis system, and then probing the third monument point 22c to define the Y-axis of the monument point axis system). For example, software implemented as instructions on a computer-readable medium may align the machine axis system 56 to the monument point axis system 46 to establish the machine axis baseline 132.

Those skilled in the art will recognize that the operational step of establishing the machine axis baseline 132, as illustrated in block 212, may be a one-time process. However, the operational step illustrated in block 212 may be repeated as needed, for example during routine machine maintenance or if the location of one or more of the plurality of monument points 22 changes.

As shown at block 214, a part 42 (FIG. 2) may be loaded onto the machine bed 14. The part 42 may be positioned on the machine bed 14 with respect to the plurality of monument points 22 (e.g., within the work envelope 40). For example, a fixture 48 may be loaded onto the machine bed 14 and the part 42 may be loaded onto the fixture 48 (e.g., a fixtured part 50). In an example implementation, a vacuum may be applied to clamp the part 42 to the fixture 48 and to clamp the fixture 48 to the machine bed 14.

As shown at block 216, part data 72 (FIG. 3) may be generated. The part data 72 may be generated by scanning the part 42 positioned on the machine bed 14 (e.g., a fixtured part 50), the machine bed 14, and the plurality of monument points 22 with the image capture device 26 (FIG. 2). The part data 72 may include scan data representing the part 42 (e.g., the fixtured part 50) and the plurality of monument points 22 on the machine bed 14 based on the 3D scan of the part 42, the machine bed 14, and the plurality of monument points 22. Thus, the part data 72 may include a plurality of reference points 74 (e.g., a cloud or a mesh of reference points 74) representing the part 42 positioned on the machine bed 14 with respect to the plurality of monuments points 22. The part data 72 may be received by the computer 44 (e.g., via the electronic communication link 80). For example, software implemented as instructions on a computer-readable medium may generate (e.g., automatically) the part data 72 based on the 3D scan.

As shown at block 218, a part model 76 (FIG. 3) may be generated from the part data 72. The part model 76 may include a geometric representation 78 of the part 42 with respect to the plurality of monument points 22 (FIG. 2). Thus, the part model 76 may establish a relationship between the part 42 and the plurality of monument points 22 upon the machine bed 14. For example, software implemented as instructions on a computer-readable medium may generate the part model 76 by processing the part data 72.

Figure 4:
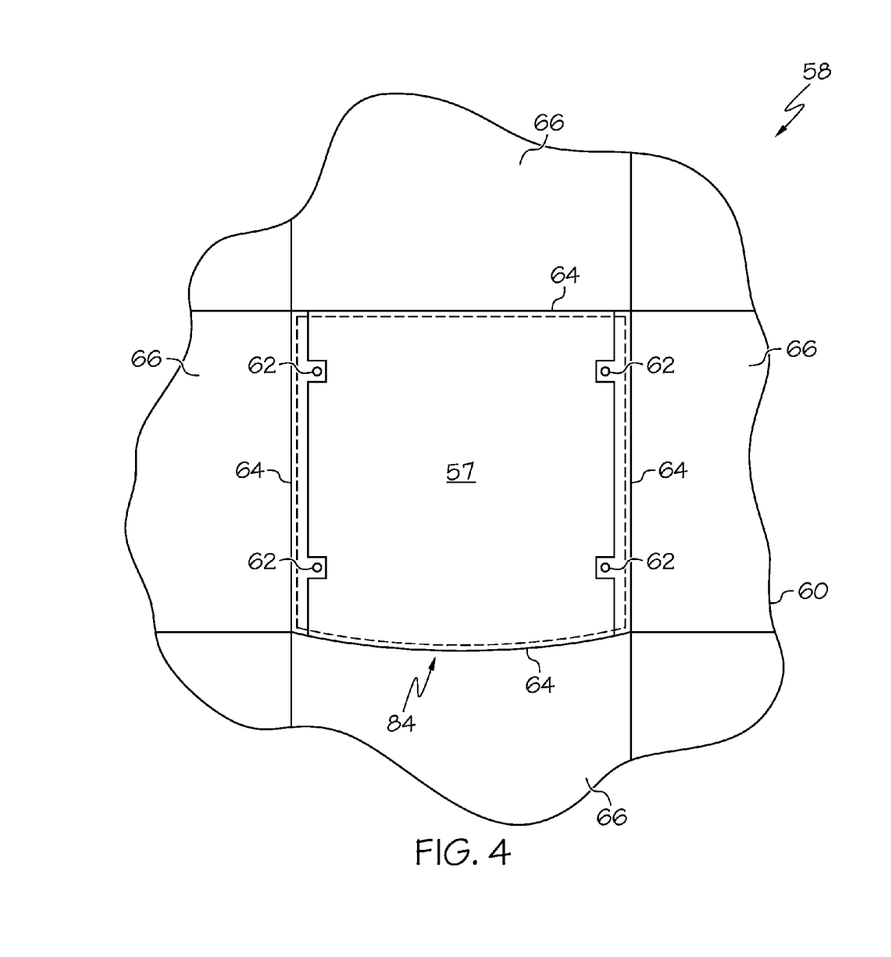
FIG. 4 is a partial front elevational view of one embodiment of the component to which the machined part will be coupled.

As shown at block 220, theoretical machined part data 82 (FIG. 3) may be generated. The theoretical machined part data 82 may include data representing a theoretical machined part 57 (FIG. 4). The theoretical machined part 57 may be a theoretical representation of a machined part 112 following a machining operation. The theoretical machined part 57 (shown in broken lines in FIG. 4) may include one or more theoretical machined features 84 (e.g., one or more theoretical representations of one or more machined features) (FIG. 4). Those skilled in the art will appreciate that the theoretical machined part data 82 may include nominal part data 86, measured data 88 (e.g., reverse engineered data) acquired from the surround structure 60 (FIG. 4) of the component 58 (e.g., an aircraft) (FIG. 4), or an integrated combination 90 of nominal part data 86 and measured data 88, and which and may be unique to each machined part 112. The theoretical machined part data 82 may include a plurality of reference points 92 (FIG. 3) representing the theoretical machined part 57 (FIG. 4) based on nominal part data 86, measured data 88 or an integrated combination 90 of the two.

Referring to FIG. 4, for example, the theoretical machined part data 82 (FIG. 3) may include measured data 88 (FIG. 3) from a surround structure 60, part attachment points 62, and/or net trim 64 of adjacent parts 66 (e.g., adjacent panels) of the component 58 (FIG. 3), such as an aircraft, to which the machined part 112 (FIG. 3), such as a panel, will be connected. Thus, the theoretical machined part data 82 may include a plurality of reference points 92 representing the theoretical machined part 57 and one or more theoretical machined features 84 (e.g., net contour, net trim, drilled holes, countersunk holes, and the like) following a machining operation of the part 42 based on the geometry of the component 58 to which the machined part 112 will be connected.

In an example implementation, the theoretical machined part data 82 may be collected or acquired by scanning (e.g., with portable coordinate measurement equipment) the surround structure 60 of the component 58 (e.g., an aircraft) including, but not limited to, part attachment points 62 and/or net trim 64 of the adjacent parts 66 (e.g., adjacent panels). In another example implementation, the theoretical machined part data 82 may be generated and/or acquired from design characteristics and/or features of the machined part 112, such as based on a nominal CAD model 95. The theoretical machined part data 82 may be received by the computer 44 (e.g., via the electronic communication link 80, as shown in FIG. 1).

Referring again to FIG. 5 and in reference to FIGS. 1-4, as shown at block 222, a theoretical machined part model 94 may be generated from the theoretical machined part data 82 (FIG. 3). The theoretical machined part model 94 may include a geometric representation 98 of the theoretical machine part data 82. Thus, the theoretical machined part model 94 may include a geometric representation of one or more theoretical machined features 84 (e.g., nominal contour and/or trim geometry, location of attachment points, and the like) of the theoretical machine part 57 (FIG. 4) following a machining operation of the part 42 based on either the measured data 88 (FIG. 3) from a component 58 (FIG. 4) to which the machined part 112 will be connected, the nominal part data 86 (e.g., from a nominal CAD model 95), or the integrated combination 90 of the two. For example, software implemented as instructions on a computer-readable medium may generate the theoretical machined part model 94 by processing the theoretical machined part data 82.

As shown at block 224, control data 97 (FIG. 3) may be generated. The control data 97 may be generated by integrating the part data 72 and the theoretical machined part data 82. For example, the control data 97 may be generated by running a best-fit routine to align at least a portion of (e.g., a subset of) the plurality of reference points 74 of the part data 72 representing the part 42 and at least a portion of (e.g., a subset of) the plurality of reference points 92 of the theoretical machined part data 82 representing the theoretical machined part 57. Thus, the control data 97 may include a plurality of reference points 99 representing an integration of the part 42 and the theoretical machined part 57 (e.g., including theoretical machined features 84). For example, software implemented as instructions on a computer-readable medium may generate the control data 97 by integrating (e.g., running a best-fit routine) the part data 72 and the theoretical machined part data 82.

For example, generating the control data 97 may include an integration of the plurality of reference points 74 of the part data 72 and the plurality of reference points 92 of the theoretical machined part data 82 via a least squares translation. Those skilled in the art will appreciate that there may be two types of data that may be used for the best-fit routine. A first example may contain several thousand reference points scanned directly from a surface of the part 42 (e.g., a full surface routine). A second example may contain a specific (e.g., finite) number of target reference points individually placed on a surface either inside or outside of the part area (e.g., a finite point cloud routine). Both of these routines may use contour geometry of the part data 72 and the theoretical machined part data 82 as the primary alignment feature and may use two net trimmed edges of the part data 72 and the theoretical machined part data 82 as the secondary and tertiary alignment features.

In an example implementation, integrating the part data 72 and the theoretical machined part data 82 may include generating a control model 100 (FIG. 3), as illustrated at block 226. The control model 100 may be generated by aligning and comparing the part model 76 (e.g., the geometric representation 78 of the part 42) and the theoretical machined part model 94 (e.g., the geometric representation 98 of the theoretical machined part) by using the best-fit routine. Thus, the control model 100 may include the geometric representation 102 of an integration of the part 42 with the theoretical machined part 57 (including theoretical machined features 84). For example, software implemented as instructions on a computer-readable medium may generate the control model 100 by integrating the part model 76 and the theoretical machined part model 94 (e.g., using the best-fit routine).

In an example implementation, the best-fit routine may be performed by using a portion (e.g., at least one feature, such as contour) of the part model 76 (e.g., the geometric representation 78 of the part 42) and a portion (e.g., one feature, such as contour) of the theoretical machined part model 94 (e.g., the geometric representation 98 of the theoretical machined part 57) as a primary alignment feature and using another portion (e.g., at least one feature, such as two trim edges) of the part model 76 (e.g., the geometric representation 78 of the part 42) and another portion (e.g., at least one feature, such as two trim edges) of the theoretical machined part model 94 (e.g., the geometric representation 98 of the theoretical machined part 57) as a secondary alignment feature and/or a tertiary alignment feature. For example, the best-fit routine may be performed by aligning the contour of the panel (e.g., part model 76 contour geometry to theoretical machined part model 94 contour geometry) as the primary alignment feature and using two net trimmed edges of the panel (e.g., part model 76 net trim geometry to the corresponding geometric representation of the adjacent panels 66 (FIG. 3) of the component 58 (e.g., aircraft) of the theoretical machined part model 94) as the secondary and tertiary alignment features.

As shown at block 228, the control data 97 (FIG. 3) may be validated. Validation of the control data 97 may include verifying that the results of the best-fit routine, as shown at block 224, established between the part data 72 and the theoretical part data 82 is within a required tolerance. For example, the control data 97 (e.g., the control model 100) may be validated by comparing error (e.g., deviation) of the best fit of at least one reference point 74 of the part data 72 (e.g., the part model 76) and at least one corresponding reference point 92 of the theoretical machined part data 82 (e.g., the theoretical machined part model 94) to a tolerance threshold range. In an example implementation, compared error may include the plurality of reference points 74 of the part data 72 and the plurality of reference points 92 of the theoretical machined part data 82. In another example implementation, compared error may include a subset of the plurality of reference points 74 of the part data 72 and a subset of the plurality of reference points 92 of the theoretical machined part data 82. Thus, error for each reference point, or a subset of reference points, may be compared.

Those skilled in the art will appreciate that a predetermined percentage of outliers may be discarded during the comparison because such outliers may represent dust or debris on the part or other anomalies.

In an example implementation, validation of the control data 97 may include verifying that the part model 76 and the theoretical machined part model 94 are within +/−0.020 inches for contour and trim, upon the best fit. For example, software implemented as instructions on a computer-readable medium may validate the error threshold of the control data 97 and verify that control data 97 is within the required tolerance and, optionally, may alert the machine operator if certain tolerance requirements (e.g., error threshold) are not met.

Figure 6:
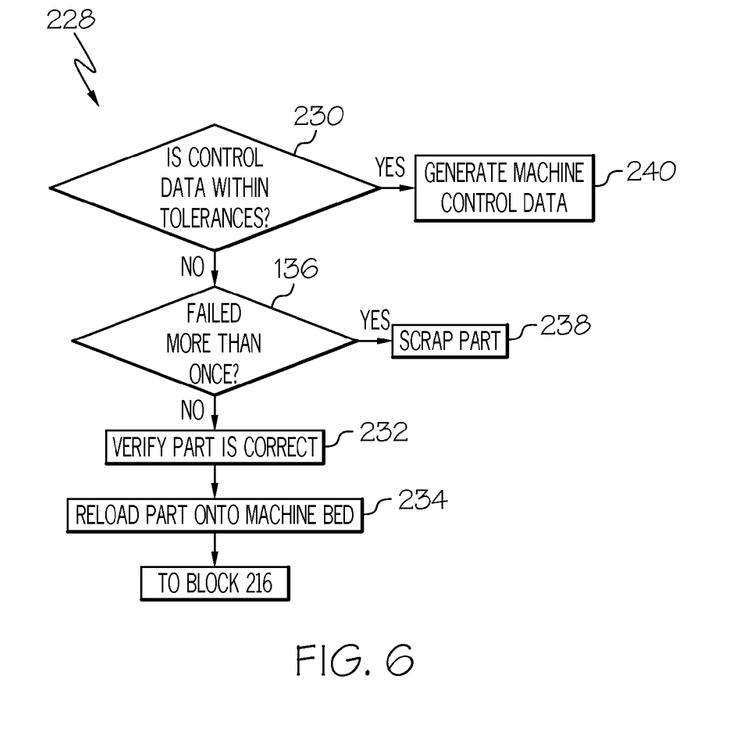
FIG. 6 is a flow diagram illustrating an example of validating the control data of FIG. 5.

Referring now to FIG. 6, validating the control data 97 (FIG. 3), as shown at block 228, may include determining if the control data 97 is within the required tolerance, as shown at block 230. If the control data 97 is not within the required tolerance, then part verification may be performed (e.g., verifying that the correct part has been loaded on the fixture 48 and/or the machine bed 14), as illustrated in block 232. The fixture 48 with the part 42 may then be re-loaded onto the machine bed 14 (FIG. 2), as illustrated in block 234. The operational steps shown at blocks 216, 218, 220, 222, 224, 226, and 228 may be repeated, as illustrated in FIG. 5. If the control data 97 is not within the required tolerance, as shown at block 230, after a second validation of the control data 97, as shown at block 136 (e.g., failed more than once), the part 42 (FIG. 3) may be scrapped, as illustrated in block 238.

Referring again to FIG. 5, as shown at block 240, if the control data 97 (FIG. 3) is within the required tolerance, as shown at block 230 (FIG. 6), machine control data 104 may be generated. The machine control data 104 may be generated by aligning the control data 97 to the monument point data 62 (FIG. 3). For example, the machine control data 104 may be generated by running an axis-alignment routine to align at least a portion of (e.g., a subset of) the plurality of reference points 99 of the control data 97 (e.g., representing the plurality of monument points 22) to at least a portion of (e.g., a subset of) the plurality of reference points 64 of the monument point data 62 (e.g., representing the plurality of monument points 22 defining the monument point axis system 46). Thus, the machine control data 104 may include a plurality of reference points 106 representing the integration of the part 42 and the theoretical machined part 57 positioned on the machine bed 14 with respect to the plurality of monuments points 22. For example, software implemented as instructions on a computer-readable medium may generate the machine control data 104 by aligning the control data 97 to the monument point data 62 (e.g., using the axis-alignment routine).

In an example implementation, as shown at block 242, generating the machine control data 104 may include generating a machine control model 108 (FIG. 3). The machine control model 108 may be generated by aligning the control model 100 to the monument point model 68 through the axis-alignment routine. For example, the axis-alignment routine may align the control model 100 to the monument point axis system 46 by aligning the at least a portion of the geometric representation 102 of the control model 100 (e.g., the plurality of monument points 22) with at least a portion of the geometric representation 70 of the monument point model 68 (e.g., the plurality of monument points 22 defining the monument point axis system 46). Thus, the machine control model 108 may include a geometric representation 110 of the alignment of the part 42 with the theoretical machined part 57 and the plurality of monument points 22 on the machine bed 14. For example, software implemented as instructions on a computer-readable medium may align the control model 100 to the monument point model 68 (e.g., running an axis-alignment routine).

The machine control data 104 (FIG. 3) may become machine drive data that is used by the NC machine 12 to machine the part 42 (FIG. 2) and form the machined part 112 (FIG. 3). For example, the machine control data 104 generated by the axis-alignment routine, as shown at block 240, may tell the machine tool 16 (e.g., the spindle 18) where the part 42 (e.g., the fixtured part 50) is located on the machine bed 14 with respect to the plurality of monument points 22 and how the part 42 is orientated with respect to the monument point axis system 46.

As shown at block 244, the machine control data 104 (FIG. 3) may be validated. Validation of the machine control data 104 may include verifying (e.g., automatically verifying) that the axis-alignment routine established between the control data 97 (e.g., the control model 100) and the monument point data 62 (e.g., the monument point model 68) defining the monument point axis system 46 is within a required tolerance. For example, the machine control data 104 (e.g., the machine control model 108) may be validated by comparing error (e.g., deviation) of the axis-alignment of at least one reference point 99 of the control data 97 (e.g., the geometric representation 102 of the control model 100) and at least one corresponding reference point 64 of the monument point data 62 (e.g., the geometric representation 70 of the monument point model 68) to a tolerance threshold range. In an example implementation, compared error may include the plurality of reference points 99 of the control data 97 and the plurality of reference points 64 of the monument point data 62. In another example implementation, compared error may include a subset of the plurality of reference points 99 of the control data 97 and a subset of the plurality of reference points 64 of the monument point data 62. Thus, error for each reference point, or a subset of reference points, may be compared.

Those skilled in the art will appreciate that a predetermined percentage of outliers may be discarded during the comparison because such outliers may represent dust or debris on the part or other anomalies.

In an example implementation, validation of the machine control data 104 may include verifying that the axis-alignment established between the control model 100 and the monument point model 68 (e.g., the monument point axis system 46) is within +/−0.005 inches or less. For example, software implemented as instructions on a computer-readable medium may validate the error threshold of the machine control data 104 and verify that the machine control data 104 is within the required tolerance and, optionally, may alert the machine operator if certain tolerance requirements (e.g., error threshold) are not met.

Figure 7:
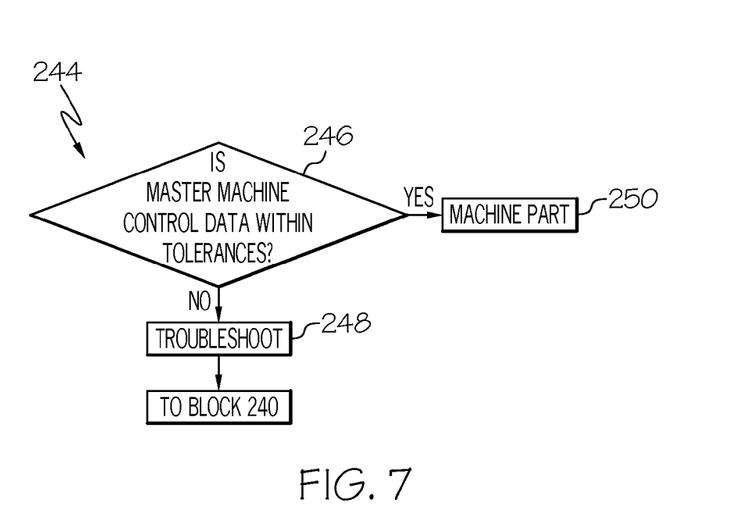
FIG. 7 is a flow diagram illustrating an example of validating the machine control data of FIG. 5.

Referring to FIG. 7, validating the machine control data 104, as shown at block 244 (FIG. 5), may include determining if the machine control data 104 is within the required tolerance, as shown at block 246. If the machine control data 104 is not within the required tolerance, then one or more troubleshooting processes may be performed, as shown at block 248. For example, if the geometric representation 110 of the machine control model 108 and the geometric representation 70 of the monument point model 68 (e.g., the monument point axis system 46) are not aligned within the required tolerance, the reflective surface of the plurality of monument points 22 and/or the lens of the image capture device 26 may be checked for debris or grease and/or cleaned. The operational steps shown at blocks 240, 242, and 244 may be repeated, as illustrated in FIG. 5.

Those skilled in the art will appreciate that the comparison results described in the validation steps shown at blocks 228 and 244 may be viewed (e.g., by the machine operator on the computer 44), may be output as YES/NO, as shown at block 230 and block 246, or may be passed on to the next operational step, as shown at block 240 and block 250. The validation step, as shown at block 228, may be a check-and-balance operation to ensure that the integration of the part data 72 and the theoretical machined part data 82 was accurate. The validation step, as shown at block 244, may be a check-and-balance operation to ensure that the alignment of the control data 97 and the monument point data 62 (e.g., the monument axis system 46) was accurate.

Referring again to FIG. 5, as shown at block 250, if the machine control data 104 is within the require tolerance, as shown at block 246 (FIG. 7), then the machine control data 104 may be executed (e.g., via the machine controller 54) to control operation of the NC machine 12 (FIG. 2) and the part 42 may be machined to form the machined part 112, as shown at block 252. For example, the machine control data 104 may be executed by the operating program and/or software implemented as instructions on a computer-readable medium and/or the machine controller 54 to machine the part 42 (e.g., drill, countersink, route, cut, and/or other machining operation) to form the machined part 112.

Thus, the disclosed method 200 may automatically locate the part 42 (FIG. 2) and may reduce cycle time and cost of machining parts. The disclosed method 200 may allow the machine operator to place the part 42 (e.g., the fixtured part 50) on the machine bed 14 anywhere because the NC machine 12 will automatically locate the part 42 and automatically align the machine axis system 56 (FIG. 1).

Figure 8:
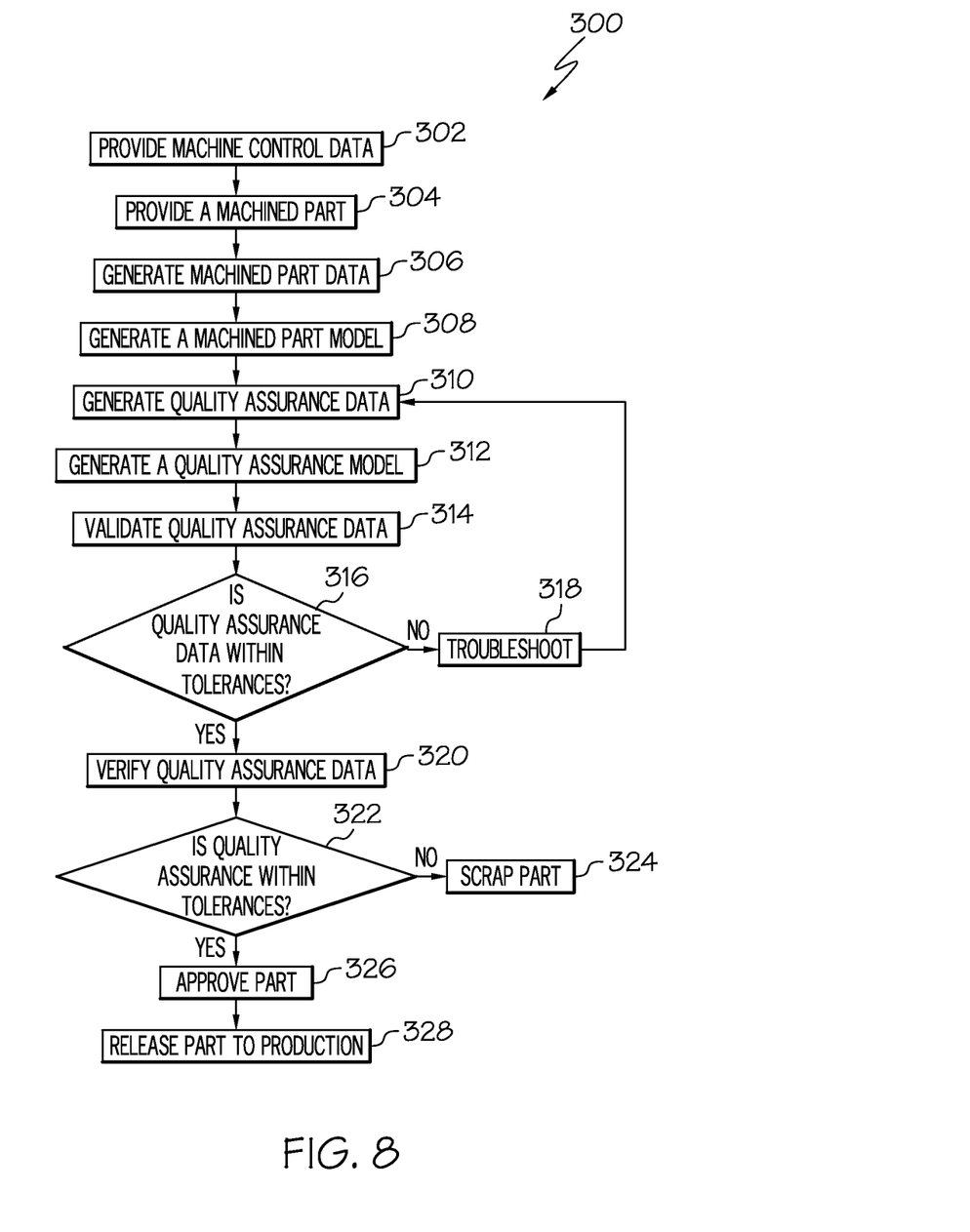
FIG. 8 is a flow diagram illustrating one embodiment of the disclosed method for performing quality assurance.

Referring to FIG. 8 and in reference to FIGS. 1-4, also disclosed is a method, generally designated 300, for performing quality assurance. For example, the disclosed method 300 may be automatically performed on the machined part 112 (FIG. 3) formed in accordance with the disclosed system 10 (FIG. 2) and method 200 (FIG. 5).

As shown at block 302, machine control data 104 (FIG. 3) may be provided. For example, the machine control data 104 may be generated in accordance with the operational steps shown at blocks 240, 242 and 244.

As shown at block 304, a machined part 112 may be provided. For example, the machined part 112 may be machined by the NC machine 12 of the disclosed system 10 (FIG. 2) executing an operating program using the machine control data 104, as shown at blocks 250 and 252 (FIG. 5).

As shown at block 306, machined part data 114 may be generated. The machined part data 114 may be generated by capturing a digital image of (e.g., scanning) the machined part 112 positioned on the machine bed 14, the machine bed 14, and the plurality of monument points 22 with the image capture device 26 (FIG. 2). For example, the machined part data 114 may include digital data representing the machined part 112 (e.g., the machined part 112 having one or more machined features 122) and the plurality of monument points 22 on the machine bed 14 based on a 3D scan of a machined part 112. Thus, the machined part data 114 may include a plurality of reference points 116 (e.g., a cloud or mesh of reference points) representing the machined part 112 (including the machined features 122) positioned on the machine bed 14 with respect to the plurality of monument points 22. The machined part data 114 may be received by the computer 44 (e.g., via the electronic communication link 80). For example, software implemented as instructions on a computer-readable medium may generate (e.g., automatically) the machined part data 114 based on the 3D scan.

As shown at block 308, a machined part model 118 may be generated based on the machined part data 114. The machined part model 118 may include a geometric representation 120 of the machined part 112 including one or more machined features 122 (e.g., net contour, net trim, drilled holes, countersunk holes, and the like) with respect to the plurality of monument points 22. Thus, the machined part model may establish a relationship between the machined part 112 and the plurality of monument points 22 upon the machine bed 14. For example, software implemented as instructions on a computer-readable medium may generate the machined part model 118 by processing the machined part data 114.

The resultant geometry of the scanned machined part 112 with respect to the plurality of monument points 22 represented by the machined part data 114 (e.g., the machined part model 118) may be used to validate the machined part 112 compared to the machine control data 104 (e.g., machine control model 108) for quality assurance purposes (e.g., ensure that machining was properly performed according to the machine control model 108).

As shown at block 310, quality assurance data 124 may be generated. The quality assurance data 124 may be generated by integrating the machined part data 114 and the machine control data 104. For example, the quality assurance data 124 may be generated by running an axis-alignment routine to align at least a portion of (e.g., a subset of) the plurality of reference points 116 of the machined part data 114 (e.g., representing the plurality of monument points 22) to at least a portion of (e.g., a subset of) the plurality of reference points 106 of the machine control data 104 (e.g., the plurality of monument points 22 defining the monument point axis system 46). Thus, the quality assurance data 124 may include a plurality of reference points 128 representing the machined part 112 (including the machined features 122) positioned on the machine bed 14 with respect to the plurality of monument points 22 and further include the machine control data 104. For example, software implemented as instructions on a computer-readable medium may generate the quality assurance data 124 by integrating the machined part data 114 and the machine control data 104 (e.g., using the axis-alignment routine).

In an example implementation, as shown at block 312, generating the quality assurance data 124 may include generating a quality assurance model 126. The quality assurance model 126 may be generated by aligning the machined part model 118 to the machine control model 108 along the monument axis system 46 through an axis-alignment routine. For example, the axis-alignment routine may align the machined part model 118 to the machine control model 108 by aligning at least a portion of the geometric representation 120 of the machined part model 118 with at least a portion of the geometric representation 110 of the machine control model 108. Thus, the quality assurance model 126 may include a geometric representation 130 of the machined part 112 including one or more machined features 122 with respect to the plurality of monument points 22 and further include the machine control model 108. For example, software implemented as instructions on a computer-readable medium may align the machined part model 118 to the machine control model 108 (e.g., running an axis-alignment routine).

The axis-alignment routine may enable the machined part 112 represented by the machined part data 114 (e.g., the machined part model 118) to be compared to the machine control data 104 (e.g., machine control model 108) that was used as the drive geometry of the NC machine 12 to machine the part 42.

As shown at block 314, the quality assurance data 124 may be validated. Validation of the quality assurance data 124 may include verifying (e.g., automatically verifying) that the axis-alignment routine established between the machined part data 114 (e.g., the machined part model 118) and the machine control data 104 (e.g., the machine control model 108) is within a required tolerance. For example, the quality assurance data 124 (e.g., the quality assurance model 126) may be validated by comparing error (e.g., deviation) of the axis-alignment of at least one reference point 116 of the machined part data 114 (e.g., representing the plurality of monument points 22 in the machined part model 118) and at least one corresponding reference point 106 of the machine control data 104 (e.g., representing the plurality of monument points 22 of the machine control model 108) to a tolerance threshold range. In an example implementation, compared error may include the plurality of reference points 116 of the machined part data 114 and the plurality of reference points 106 of the machine control data 104. In another example implementation, compared error may include a subset of the plurality of reference points 116 of the machined part data 114 and a subset of the plurality of reference points 106 of the machine control data 104. Thus, error for each reference point, or a subset of reference points, may be compared.

Those skilled in the art will appreciate that a predetermined percentage of outliers may be discarded during the comparison because such outliers may represent dust or debris on the part or other anomalies.

In an example implementation, validation of the quality assurance data 124 may include verifying that axis-alignment established between the machined part model 118 and the machine control model 108 (e.g., using the plurality of monument points 22 common to both for alignment) is within +/−0.005 inches or less. For example, software implemented as instructions on a computer-readable medium may validate the error threshold of the quality assurance data 124 and verify that the quality assurance data 124 is within the required tolerance and, optionally, may alert the machine operator if certain tolerance requirements (e.g., error threshold) are not met.

Validating the quality assurance data 124, as shown at block 314, may include determining if the quality assurance data 124 is within the required tolerance, as shown at block 316. If the quality assurance data 124 is not within the required tolerance, then one or more troubleshooting processes may be performed, as shown at block 318. For example, the reflective surface of the plurality of monument points 22 and/or the lens of the image capture device 26 may be checked for debris or grease and/or cleaned. The operational steps shown at blocks 310, 312, and 314 may be repeated.

As shown at block 320, if the quality assurance data 124 is within the required tolerance, as shown at block 316, then quality assurance of the machined part 112 may be verified. Verification of the machined part 112 via the quality assurance data 124 may include verifying (e.g., automatically verifying) that one or more machined characteristics and/or machined features 122 (e.g., diameters and/or locations of drilled and counter sunk holes and/or locations of the net trim) of the machined part 112 as represented in the quality assurance data 124 (e.g., quality assurance model 126) is within a required tolerance compared to the theoretical machined characteristic and/or machined features represented in the machine control data 104 (e.g., machine control model 108).

For example, the quality assurance data 124 (e.g., the quality assurance model 126) may be verified by comparing error (e.g., deviation) of at least one reference point 128 (e.g., representing the machined features 122) of the quality assurance data 124 (e.g., the quality assurance model 126) and at least one corresponding reference point 106 (e.g., representing the theoretical machined features 84) of the machine control data 104 (e.g., the machine control model 108) to a tolerance threshold range. In an example implementation, compared error may include the plurality of reference points 128 of the quality assurance data 124 and the plurality of reference points 106 of the machine control data 104. In another example implementation, compared error may include a subset of the plurality of reference points 128 of the quality assurance data 124 and a subset of the plurality of reference points 106 of the machine control data 104. Thus, error for each reference point, or a subset of reference points, may be compared.

Those skilled in the art will appreciate that a predetermined percentage of outliers may be discarded during the comparison because such outliers may represent dust or debris on the part or other anomalies.

In an example implementation, verification of the quality assurance data 124 may include verifying that the diameters of the drilled and counter sunk holes are within +/−0.005 inches and/or the location of the drilled and/or counter sunk holes are within +/−0.030 inches and/or the location of the trim is within +/−0.030 inches. For example, software implemented as instructions on a computer-readable medium may validate the error threshold of the machined features 122 in the quality assurance data 124 and verify that machined features 122 are within the required tolerance and, optionally, may alert the machine operator if certain tolerance requirements (e.g., error threshold) are not met.

As shown at block 322, verifying the quality assurance data 124, as shown at block 320, may include determining if the characteristic of the machined features 122 as captured in the quality assurance data 124 are within the required tolerance compared to the machine control data 104. If one or more machined features 122 of the machined part 112 as represented in the quality assurance data 124 (e.g., the quality assurance model 126) compared to one or more theoretical machined features 84 of the theoretical machined part 57 as represented in the machine control data 104 are not within the required tolerance, then the machined part 112 may be scrapped, as shown at block 324. If the machined features 122 of the machined part 112 as represented in the quality assurance data 124 compared to theoretical machined features 84 represented in the machine control data 104 are within the required tolerances, then the machined part 112 may be approved, as shown at block 326, and the machined part 112 may be released to production, as shown at block 328.

The disclosed method 300 may provide an additional benefit for cost savings and cycle time by auto-verifying the machining operation performed in accordance with the disclosed method 200. For example, the disclosed method 300 may allow the machine operator to know the results of a quality assurance operation while the machined part is still in the NC machine 12, which may provide more time to respond to any quality issues before the part is due on the production floor.

Figure 9:
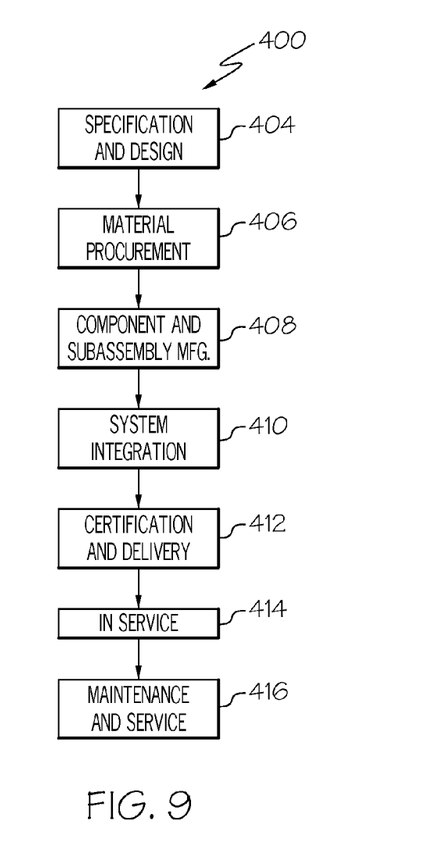
FIG. 9 is flow diagram of an aircraft production and service methodology.
Figure 10:
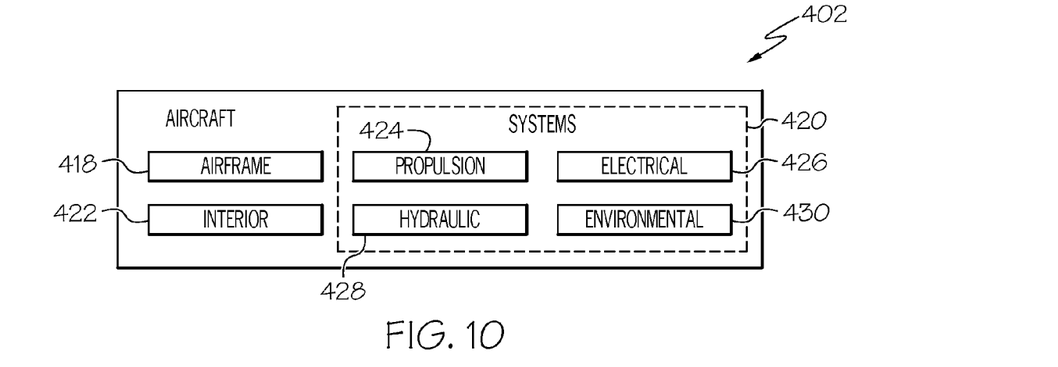
FIG. 10 is a block diagram of an aircraft.

Examples of the disclosure may be described in the context of an aircraft manufacturing and service method 400, as shown in FIG. 9, and an aircraft 402, as shown in FIG. 10. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included. Although an aerospace example is shown, the principles of the disclosed system 10 and methods 200, 300 may be applied to other industries, such as the automotive industry.

Apparatus and methods embodied herein may be employed during any one or more of the stages of the production and service method 400. For example, components or subassemblies corresponding to component/subassembly manufacturing 408, system integration 410, and or maintenance and service 416 may be fabricated or manufactured using the disclosed system 10 (FIG. 1) and methods 200 (FIG. 5) and 300 (FIG. 8). Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of apparatus examples, method examples, or a combination thereof may be utilized while the aircraft 402 is in service, for example and without limitation, to maintenance and service 416.

Although various embodiments of the disclosed system and methods have been shown and described, modifications may occur to those skilled in the art upon reading the specification. The present application includes such modifications and is limited only by the scope of the claims.

What is claimed is:

1. A method for operating a machine, said method comprising:
    generating monument point data, said monument point data comprising a plurality of reference points representing a plurality of monument points on a machine bed;
    generating part data, said part data comprising a plurality of reference points representing a part with respect to said plurality of monument points;
    generating theoretical machined part data, said theoretical machined part data comprising a plurality of reference points representing a theoretical machined part;
    generating control data by integrating said part data and said theoretical machined part data, said control data comprising a plurality of reference points representing an integration of said part and said theoretical machined part;
    generating machine control data by integrating said control data and said monument point data, said machine control data comprising a plurality of reference points representing said integration of said part and said theoretical machined part positioned on said machine bed with respect to said plurality of monument points;
    executing said machine control data for controlling operation of said machine to form a machined part;
    generating machined part data, said machined part data comprising a plurality of reference points representing said machined part positioned on said machine bed with respect to said plurality of monument points;
    generating quality assurance data by integrating said machined part data and said machine control data; and
    verifying said quality assurance data by comparing said quality assurance data and said machine control data to determine a correlation between said machined part data and said machine control data.

2. The method of claim 1 wherein generating said control data comprises performing a best-fit routine on said part data and said theoretical machined part data.

3. The method of claim 1 wherein generating said control data comprises:
    generating a part model from said part data, said part model comprising a geometric representation of said part with respect to said plurality of monument points;
    generating a theoretical machined part model from said theoretical machined part data, said theoretical machined part model comprising a geometric representation of said theoretical machined part; and
    generating a control model by integrating said part model and said theoretical machined part model.

4. The method of claim 3 wherein integrating said part model and said theoretical machined part model comprises aligning at least a portion of said geometric representation of said part with at least a portion of said geometric representation of said theoretical machined part.

5. The method of claim 1 wherein generating said machine control data comprises:
    generating a monument point model from said monument point data, said monument point model comprising a geometric representation of said plurality of monument points on said machine bed;
    generating a machine control model from said machine control data, said machine control model comprising a geometric representation of said integration of said part and said theoretical machined part positioned on said machine bed with respect to said plurality of monument points; and
    aligning said geometric representation of said plurality of monument points of said monument point model with said geometric representation of said plurality of monument points of said machine control model.

6. The method of claim 5 further comprising:
    generating an error for at least one reference point of said monument point data and at least one reference point of said control data; and comparing at least a subset of said error to a threshold range to verify that said machine control data is within tolerance.

7. The method of claim 1 further comprising establishing a machine axis baseline, wherein said monument point data defines a monument point axis system, and wherein establishing said machine axis baseline comprises aligning a machine axis system with said monument point axis system.

8. The method of claim 1 wherein generating said monument point data comprises:
   equipping a machine tool of said machine with a probe; and
   probing said plurality of monument points on said machine bed.

9. The method of claim 1 wherein said plurality of monument points comprises three monument points connected to said machine bed in an orthogonal orientation.

10. The method of claim 1 wherein each monument point of said plurality of monument points comprises an optical target configured to be defined during probing of said plurality of monument points on said machine bed.

11. The method of claim 1 wherein generating said part data comprises scanning said part positioned on said machine bed and said plurality of monument points positioned on said machine bed.

12. The method of claim 1 wherein generating said theoretical machined part data comprises at least one of using measured part data from a component to which said machined part will be coupled and using nominal part data from a nominal CAD model.

13. The method of claim 1 further comprising:
   generating an error for at least one reference point of said part data to at least one corresponding reference point of said theoretical machined part data; and
   comparing at least a subset of said error to a threshold range to verify that said control data is within tolerance.

14. The method of claim 1 wherein generating said machined part data comprises scanning said machined part positioned on said machine bed and said plurality of monument points positioned on said machine bed.

15. The method of claim 1 wherein generating said quality assurance data comprises:
   generating a machine control model from said machine control data, said machine control model comprising a geometric representation of said integration of said part and said theoretical machined part positioned on said machine bed with respect to said plurality of monument points on said machine bed;
   generating a machined part model from said machined part data, said machined part model comprising a geometric representation of said machined part positioned on said machine bed with respect to said plurality of monument points; and
   generating a quality assurance model by aligning said geometric representation of said plurality of monument points of said machine control model with said geometric representation of said plurality of monument points of said machined part model.

16. The method of claim 15 wherein verifying said quality assurance data comprises comparing said geometric representation of said machined part positioned on said machine bed with respect to said plurality of monument points of said quality assurance model to said geometric representation of said integration of said part and said theoretical machined part positioned on said machine bed with respect to said plurality of monument points of said machine control model.

17. The method of claim 16 further comprising:
   generating an error for at least one reference point of said quality assurance data to at least one corresponding reference point of said machine control data; and
   comparing at least a subset of said error to a threshold range to verify that said quality assurance data is within tolerance.

18. A system for operating a machine, said system comprising:
   a machine comprising a machine bed and a machine tool with respect to said machine bed;
   a plurality of monument points connected to said machine bed in an orthogonal orientation, said plurality of monument points defining a monument point axis system;
   at least one image capture device proximate said machine bed, said at least one image capture device being configured to scan said plurality of monument points on said machine bed and a part positioned on said machine bed; and
   at least one computer in communication with said machine and said at least one image capture device, said at least one computer being configured to:
      receive monument point data, said monument point data comprising a plurality of reference points representing said plurality of monument points on said machine bed;
      receive part data, said part data comprising a plurality of reference points representing said part with respect to said plurality of monument points;
      receive theoretical machined part data, said theoretical machined part data comprising a plurality of reference points representing a theoretical machined part;
      generate control data by integrating said part data and said theoretical machined part data, said control data comprising a plurality of reference points representing an integration of said part and said theoretical machined part;
      generate machine control data by integrating said control data and said monument point data, said machine control data comprising a plurality of reference points representing said integration of said part and said theoretical machined part positioned on said machine bed with respect to said plurality of monument points;
      execute said machine control data for controlling operation of said machine to form a machined part;
      generate machined part data, said machined part data comprising a plurality of reference points representing said machined part positioned on said machine bed with respect to said plurality of monument points;
      generate quality assurance data by integrating said machined part data and said machine control data; and
      verify said quality assurance data by comparing said quality assurance data and said machine control data to determine a correlation between said machined part data and said machine control data.

* * * * *